May 19, 1936.        L. MYERS        2,041,200
DISHER
Filed Feb. 16, 1934        2 Sheets-Sheet 1
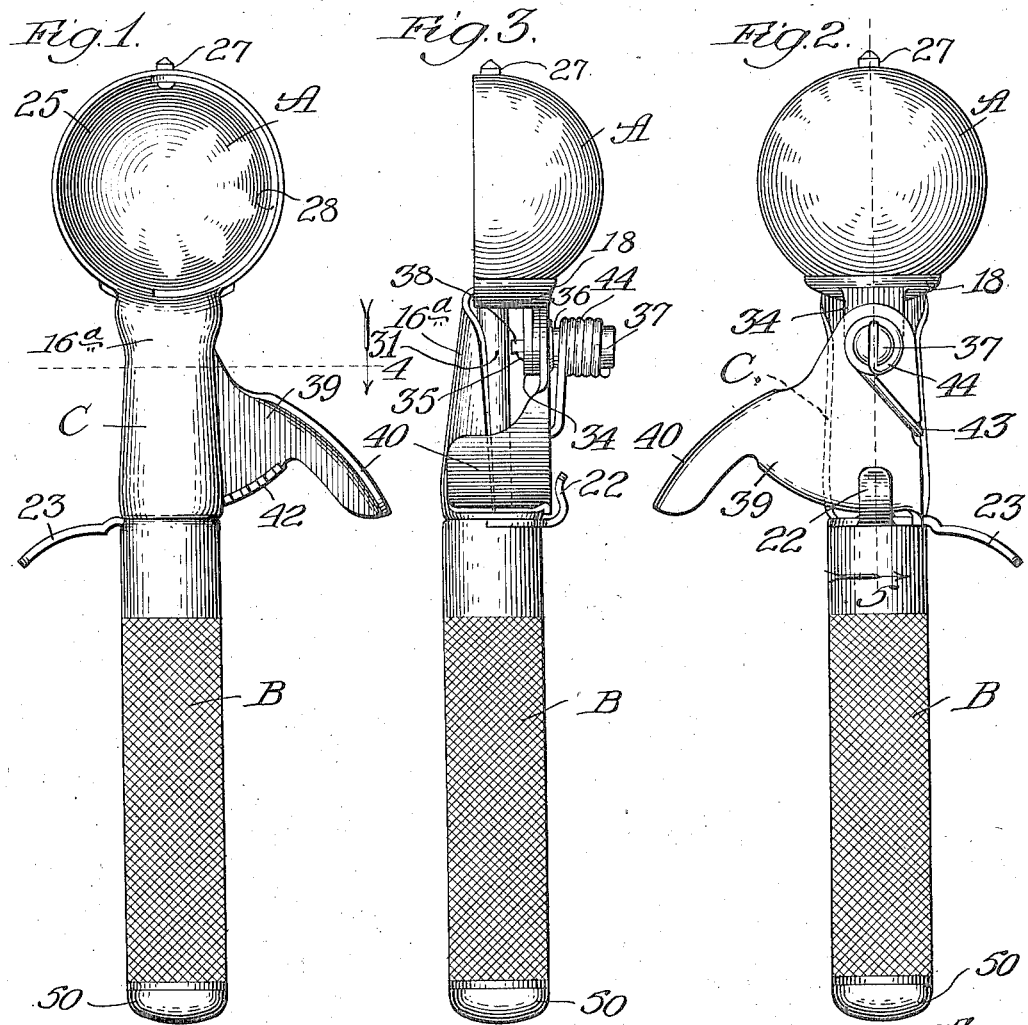
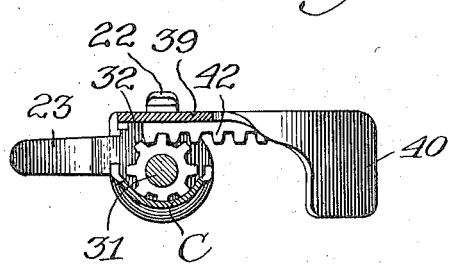
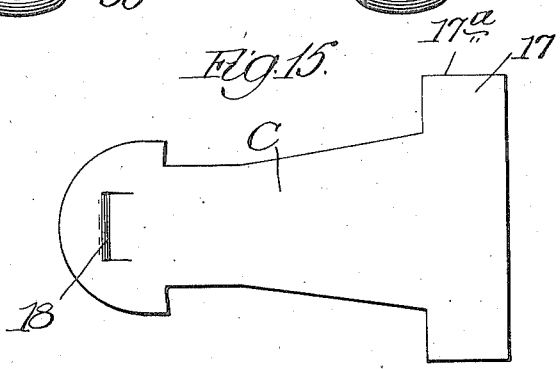
Inventor:
Louis Myers,
By Dyrenforth, Lee, Chritton & Wiles,
Attys.

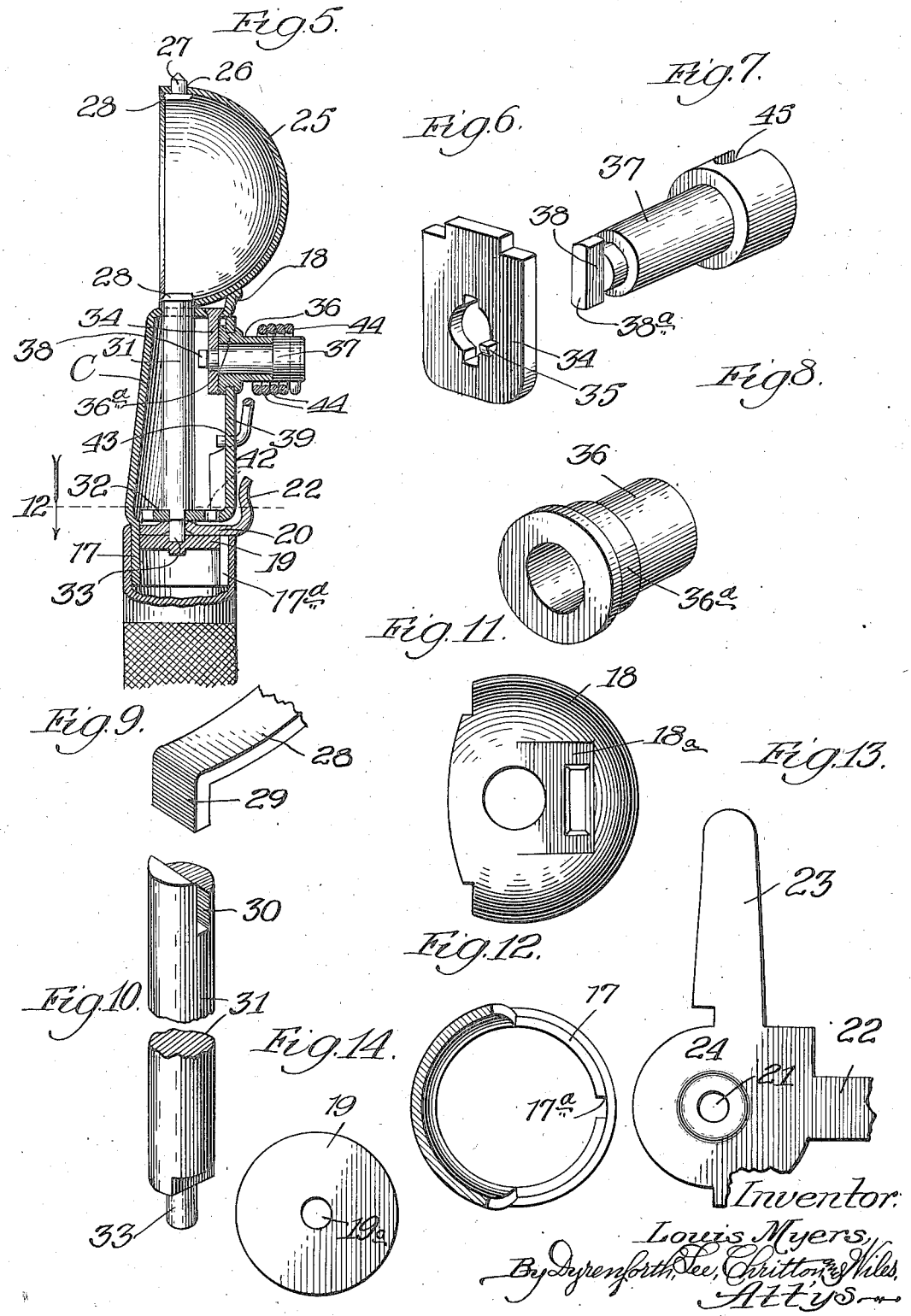

Patented May 19, 1936

2,041,200

UNITED STATES PATENT OFFICE 2,041,200

DISHER

Louis Myers, Chicago, Ill., assignor to Myers Manufacturing Company, Galesburg, Ill., a corporation of Illinois Application February 16, 1934, Serial No. 711,603

3 Claims. (Cl. 107—48)

This invention relates to improvements in dishers or ladles and, more especially, a self-emptying disher or ladle of the type commonly used in dispensing ice-cream and other semi-solid materials.

Among the features of my invention is the provision of a disher that can be easily and cheaply manufactured of stamped sheet material and one which is simple, efficient and strong in construction and operation.

Another feature of my invention is the provision of a disher that can readily be assembled and disassembled, thus facilitating cleaning and repairing. Another feature is the provision of a water-tight handle.

Other features and advantages of my invention will appear more fully in the following description and drawings, in which—

Figure 1 is a top plan view; Fig. 2, a bottom plan view; Fig. 3, a side elevation; Fig. 4, a sectional view along line 4 of Fig. 1; Fig. 5, a vertical sectional view along line 5 of Fig. 2; Fig. 6, an enlarged view in perspective of a stud depending from the ladle bowl; Fig. 7, an enlarged view in perspective of a pin adapted to bear in said stud; Fig. 8, an enlarged view in perspective of a socket for the pin shown in Fig. 7; Fig. 9, an enlarged broken perspective view of the lower portion of the scraper; Fig. 10, a broken enlarged perspective view of the scraper-actuating shaft; Fig. 11, an enlarged plan view of a bridging member; Fig. 12, an enlarged sectional view along the line 12 of Fig. 5 with the scraper shaft removed; Fig. 13, an enlarged plan view of a blank from which the handle seal is stamped; Fig. 14, an enlarged plan view of a handle disc; and Fig. 15, a view of the blank from which the bridging member is formed.

Referring to the drawings, the disher includes primarily a bowl or scoop portion A equipped with a scraper; a knurled tubular handle portion B; a bridging member C connecting the bowl to the handle; and suitable scraper-actuating mechanism.

The bowl A and bridging member C may be pressed or drawn out of sheet metal previously stamped into suitable blanks; and the handle B may be tubular material.

The bridging member C has one end tubular, as indicated by 17, so that it may be inserted into one end of the tubular handle and fastened as by soldering or brazing. The other end is provided with a lip 18 suitably concaved to fit against the bowl A; and this end is fastened to the bowl as by soldering or brazing. The intermediate or major portion of the bridging member C is concavo-convex in form to give it strength. Fig. 15 shows the blank from which the member C is formed.

To provide a water-tight seal for the handle, the disc 19 is inserted in the tubular end 17 of the bridging member C, and this disc is provided with a central indentation 19ª serving as a bearing for one end 33 of the scraper-actuating shaft 31. 20 indicates a disc with a central perforation 21 also serving as a bearing for the end 33 of the shaft 31. The disc 20 may be formed from a blank 24, as shown in Fig. 13, and the same is provided with a finger piece 23 and a retaining lug 22 bent to the positions shown in Figs. 1 and 3 in the completed disher. The disc 20 may be soldered, brazed, or otherwise secured in the position shown in Fig. 5. Any space such as 17ª that is left between the edges of the tubular end 17 of the member C is closed by the disc 20 to keep the handle water-tight.

The scoop A comprises a semi-hemispherical bowl 25 having a perforation 26 on the side opposite the handle to receive an extension pin 27 of the scraper 28 adapted to be reciprocated along the inside surface of the bowl. The curved scraper is provided at the handle end with a depending flange 29 adapted to seat in the slot 30 in the end of the shaft 31, which has a bearing in the bowl 25 and the bowl-supporting section 18 of the member C. Near the other end of the shaft 31 is a gear 32.

The following means are provided for rotating the shaft 31 to swing the scraper knife 28 in the bowl 25 to loosen the contents thereof in the usual manner. A slotted lug 34 extends from the bowl. As here shown, this lug is supported by being riveted in the bowl-engaging portion 18 of the bridging member C. As clearly shown in Fig. 6, one side of the lug is provided adjacent the slot, for a purpose to be explained, with a small abutment 35. A lever-supporting bushing 36 having a stepped-off portion 36ª is retained adjacent said depending lug by a stud 37 presenting a rectangular extension 38 having shoulder portions 38ª adapted to be inserted in the slot of said lug and to be retained therein by a 90° rotation to bear against the abutment 35. This fastens the stud 37 in the lug 34 by a bayonet lock. The stud is yieldingly held in locked position by the spring 44.

To actuate the shaft 31, a flat lever 39, also formed of sheet metal, having a pressing portion 40 is riveted on the stepped-off section 36ª of the bushing 36. This lever carries a curved rack bar 42 meshing with the teeth on the gear 32. The lever 39 is provided with a notch 43 to retain one end of a spiral spring member 44 surrounding the stud 37 and bushing 36. The other end of the spring engages the slot 45 on the end of the stud. The spring is positioned to yieldably urge the scraper 28 to its normal position, as shown in Fig. 1, where the scraper is at one edge of the bowl. It will be understood that swinging the lever 39 by pressure on the finger portion 40 will cause the rack bar 42 to rotate the gear 32 to actuate the scraper. The lever 39 does not bear against the member 22 unless unusually resistant material is lodged in the bowl, when the member 22 serves to retain the lever in its course and prevent the gear teeth from becoming unmeshed. When swinging the lever 39, the bushing or sleeve 36 turns on the stud 37.

The portion 18 of the bridging member C is provided with an offset lip 18$^a$ which is perforated to receive the end of the lug 34, the latter being riveted or otherwise suitably fastened in said lip.

From the foregoing description and accompanying drawings, it will be apparent that my improved ladle can be readily assembled and cheaply manufactured, since it is substantially composed of stamped parts. It is also obvious that my ladle has a water-tight handle and a scraper-actuating mechanism that can be readily disassembled and assembled for cleaning purposes, since it is only necessary to force the spring end from its notch 43 and remove the spring 44 and stud by a quarter turn. 50 indicates a plug for the outer end of the handle B.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A disher of the type described, including; a bowl, a tubular handle secured to the bowl; a scraper swingably mounted in the bowl; a rotatably mounted scraper-operating shaft equipped with a gear; a lever provided with a curved rack bar engaging said gear; and means for sealing said handle, said means including an imperforate shaft-bearing disc seated within the end of the handle and a shaft-bearing disc seated on said first-mentioned disc, said second-mentioned disc having a rack-retaining member and a finger piece formed integral therewith.

2. A disher of the type described, including; a tubular handle; a bowl; a scraper swingably mounted in the bowl; suitable scraper-operating mechanism including a rotatable shaft; a bridging member attaching the handle to the bowl, said bridging member having one end tubular and inserted into the tubular handle and the other end secured to the bowl; and an imperforate disc in the tubular end of the bridging member, said disc having a bearing for the scraper-operating shaft.

3. A disher of the type described, including a bowl, a scraper swingably mounted in the bowl, a handle, a bridging member attaching the handle to the bowl, means for operating the scraper including a lever having its bearing adjacent the bowl and supported on a member extending from the bowl, said bearing being supported on a stud secured by a bayonet lock to the member extending from the bowl, and a spring for the lever, said spring surrounding the stud and yieldably holding the same locked.

LOUIS MYERS.